2,729,672
Patented Jan. 3, 1956

2,729,672

NON-HYGROSCOPIC CHOLINE SALTS

Francis Marc Callahan, South Nyack, N. Y., and John Joseph Swanenburg, West Chester, Pa., assignors to American Cyanamid Company, New York, N. Y., a corporation of Maine No Drawing. Application July 28, 1953,
Serial No. 370,875

1 Claim. (Cl. 260—501)

This invention relates to new salts of choline and to products containing the same.

Choline, (β-hydroxyethyl) trimethylammonium hydroxide, is widely used in pharmaceutical preparations and in the field of nutrition, usually in the form of one of its salts, such as choline chloride. The material has a strong odor and is extremely hygroscopic, making it unpleasant to handle in manufacturing operations. Owing to the extreme hygroscopicity of choline chloride, it attracts moisture to preparations containing it to the extent that in some cases the powdered material is transformed into a paste which makes it impossible to handle in powder measuring devices, in weighing operations and the like. This tendency is particularly undesirable in filling soft gelatin capsules with powdered preparations. In this operation the powder in the form of the various vitamins including those such as thiamine, riboflavin, niacinamide, pyridoxine, ascorbic acid, vitamin $B_{12}$, and sometimes mineral salts are intimately mixed, measured in a powder measuring device and encapsulated in soft gelatin. When substantial amounts of choline chloride are present and under conditions of high humidity, it is impossible to carry out this operation.

In addition, it is found that after encapsulation the choline chloride appears to absorb moisture from the soft gelatin film of the capsule, resulting in unsatisfactory or defective capsules. These conditions may be evidenced in several ways as by discoloration of the capsule due to bleeding of the dye as a result of the moisture transfer, irregularly shaped capsules, and in extreme instances, by reaction of the vitamin components of the encapsulated mixture due to the presence of water drawn into the capsule by the action of the hygroscopic salt.

Choline salts are also used in nutrition, for example, as adjuncts to animal and poultry feeds. In such instances, the hygroscopic nature of the choline salts that are commonly available makes uniform mixing difficult and the preparation otherwise unsatisfactory.

Also because of the hygroscopic nature of most presently available choline salts the salts tend to liquify, and the undesirable odor of the material becomes more pronounced than normal and makes the product less desirable for handling and use.

Attempts have been made to overcome the hygroscopicity of choline by forming certain salts which are less hygroscopic than is choline chloride, for example, choline bitartrate and the dihydrogen citrate salt. These products, however, are more hygroscopic than desirable, and there is a need for a better product for pharmaceutical manufacturing operations.

The present invention provides an improved, less hygroscopic choline salt, which is a free flowing powder even at high relative humidities, and it can be handled by ordinary measuring and encapsulating equipment without special precautions being required on account of the humidity. Furthermore, the product can be used with other vitamins of the type previously mentioned and can be enclosed in soft gelatin capsules without damage to the capsule or without resulting in undue chemical reaction between the components of the encapsulated mixture as a result of excess moisture content drawn therein by a hygroscopic material.

The new non-hygroscopic salts of the present invention are those prepared by reacting choline with 1,2,3,4-butanetetracarboxylic acid. Being a polycarboxylic acid, several salts with choline are possible. To prepare the monocholine salt, a molecular equivalent or a slight excess of choline is employed. Other choline salts are prepared in like manner using more than one molecular equivalent of choline. Illustration of these processes will be given in the following examples:

Example 1

29.2 ml. (0.1 mol) choline methanolic solution (41.5%) was added slowly with stirring to 23.4 g. (0.1 mol) of 1,2,3,4-butanetetracarboxylic acid in 200 ml. water. This was stirred and warmed to complete solution and then treated with activated charcoal. The filtrate was evaporated to an oil. The product was recrystallized from methanol-ethanol giving irregular refractive crystals. The crystals had a melting point of 156°–158° C. Chemical analysis showed the product to agree closely with the theoretical values for carbon, hydrogen, and nitrogen of monocholine 1,2,3,4-butanetetracarboxylate as follows:

|   | Calculated | Found |
|---|---|---|
|   | Percent | Percent |
| C | 46.29 | 46.04 |
| H | 6.87 | 7.08 |
| N | 4.15 | 4.16 |

A sample of the crystals prepared as described above consisted of radial clusters of columnar to elongated tabular crystals. The refractive indexes were:

$N_X = 1.490 \pm 0.003$, $N_Y = 1.525 \pm 0.003$, and
$N_Z = 1.539 \pm 0.003$

Example 2

29.2 ml. (0.1 mol) choline methanolic solution (41.5%) was added slowly with stirring to 11.7 g. (0.05 mol) of 1,2,3,4-butanetetracarboxylic acid in 200 ml. water. This was stirred and warmed to complete solution and then treated with activated charcoal. The filtrate was evaporated to an oil. The product was recrystallized from methanol-ethanol giving irregular refractive crystals, which melted at 170°–172° C. Chemical analysis showed the product to agree closely with the theoretical values of dicholine 1,2,3,4-butanetetracarboxylate as follows:

|   | Calculated | Found |
|---|---|---|
|   | Percent | Percent |
| C | 49.08 | 48.70 |
| H | 8.24 | 8.16 |
| N | 6.36 | 6.43 |

Samples of the product prepared as described above consisted of single crystals with a thin-tabular habit. The refractive indexes were:

$N_X = 1.540 \pm 0.003$, $N_Y = 1.541 \pm 0.003$, and
$N_Z = 1.580 \pm 0.003$

Both of the above products are white, crystalline, free flowing powders which make them easily adaptable for accurate compounding into powders and especially for use in gelatin capsules. They remain (powders) at approximately 100% relative humidity for a long period of time and are much better in this respect than other choline salts previously reported.

It will be understood that variations in the procedure described above may be made by those skilled in the art. Normally, it is preferred to conduct the reaction in essentially aqueous conditions. Aliphatic alcohols and other water miscible solvents may be used in whole or in part to speed up the dissolution of the reactants. Also the reaction may be warmed if desired to hasten the completion of the reaction.

What is claimed is:

Monocholine 1,2,3,4-butanetetracarboxylate.

References Cited in the file of this patent

Merck Index (6th ed.) 1952, page 239.